United States Patent [19]
Larsen

[11] 3,783,152

[45] Jan. 1, 1974

[54] N-ARYLENE POLYCARBAMATE

[75] Inventor: Donald W. Larsen, Ashton, Md.

[73] Assignee: W. R. Grace & Co., New York, N.Y.

[22] Filed: Apr. 27, 1972

[21] Appl. No.: 248,297

Related U.S. Application Data

[62] Division of Ser. No. 81,601, Oct. 16, 1970, abandoned.

[52] U.S. Cl........... 260/471 C, 117/34, 204/159.22, 252/188.3, 260/77.5 BB, 260/404, 260/468 E, 260/470, 260/481 C, 260/482 C, 260/482 B

[51] Int. Cl................... C07c 101/26, C07c 101/44

[58] Field of Search ................................ 260/471 C

[56] References Cited
UNITED STATES PATENTS 2,806,838  9/1957  Melamed ........................... 260/77.5

*Primary Examiner*—Lorraine A. Weinberger
*Assistant Examiner*—Paul J. Killos
*Attorney*—Eugene M. Bond

[57] ABSTRACT

The invention disclosed is for a method of preparing polythioether-polyurethane products from a new and novel class of polyene compositions which are formed as the reaction product of a monomeric polyisocyanate with an unsaturated monohydroxy or monoamino compound. The new polyenes may be compounded with a polythiol component having molecules containing at least two thiol groups per molecule. The curable polymer composition may be cured by a free radical generator such as actinic light to form a solid polythioether-polyurethane elastomeric or resinous product.

1 Claim, No Drawings

N-ARYLENE POLYCARBAMATE

This is a division, of application Ser. No. 81,601 filed Oct. 16, 1970, now abandoned.

This invention relates to a new and novel class of liquid polyene compositions which are formed as the reaction product of a monomeric polyisocyanate with an unsaturated monohydroxy or monoamino compound. The new polyenes may be compounded with a polythiol component to form a curable polymer composition which upon exposure to a free radical generator such as actinic light forms a solid polythioether-polyurethane elastomeric or resinous product.

It is well known in the art that cure of internally unsaturated polymers such as polybutadiene or polyisoprene may be effected with polythiols. However, such polymers, due mainly to residual internal unsaturation after curing, are unstable either to thermal oxidation or ultra-violet catalyzed oxidation, and are subject to rapid attack by ozone. Eventually degradation and embrittlement results in the internal double bond polymers, substantially reducing the useful service life of such products.

A limitation of commercially available liquid polyurethane prepolymers is the fact that they are terminated by isocyanate (—NCO) groups. These —NCO groups are extremely unstable in storage, and are highly water-sensitive such that under practical conditions, they react with traces of moisture from the atmosphere to form gaseous carbon dioxide and amino groupings which in turn react with more —NCO to form eventually a highly viscous, sometimes completely insoluble urea-extended chain network. In cases where insolubilization occurs, the polymer has to be discarded at great expense. Further, if the —NCO—terminated prepolymers come in contact with traces of either acidic or basic impurities, dimerization and/or trimerization of the —NCO functions may take place to form viscous, sometimes insoluble products during storage. Even mild alkalis such as those constituents normally present on the surface of glass vessels and containers may cause storage problems.

It has now been found that numerous defects of the prior art may be effectively overcome by practice of the present invention which provides a new and novel class of polyenes which are curable by polythiols to solid polythioether resins or elastomers. When the polyenes of the present invention are compounded with polythiols, the prepared system may be stored safely for long periods of time in the absence of a free radical generator. Upon exposure to a free radical generator such as actinic light, the prepared system may be cured rapidly and controllably to form a polythioether-polyurethane product which is low in cost and equal or better in reaction rate in polymer formation when compared with prior art compositions.

Generally stated, the new class of polyenes of the present invention include a composition which comprises the formula:

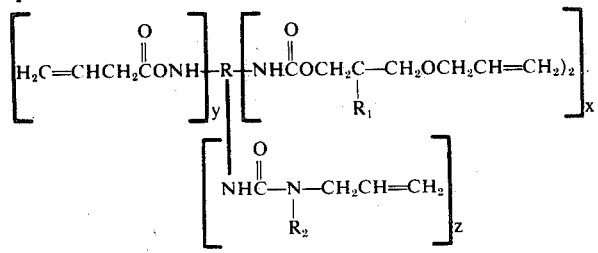

wherein:
R is a radical selected from the group consisting of alkyl, cycloalkyl, alkenyl, arylene, and sulfonyl;
$R_1$ is a radical selected from the group consisting of hydrogen, lower alkyl of one to three carbon atoms, and —$CH_2OCH_2CH=CH_2$;
$R_2$ is a radical selected from the group consisting of hydrogen, alkyl, aryl and —$CH_2CH=CH_2$; the sum of $x, y,$ and $z$ is equal to 1 to 3;
$x$ is from 0 to 3;
$y$ is from 0 to 1.5 and equal or smaller than the sum of $x$ and $z$; and
$z$ is from 0 to 3.

A general method of forming one type of polyene is to react a polyol with a polyisocyanate. The reaction is carried out in an inert moisture-free atmosphere (nitrogen blanket) at atmospheric pressure at a temperature in the range from 0° to about 120°C for a period of about 5 minutes to about 24 hours. The reaction is preferably a one-step reaction wherein all the reactants are charged together. However, the reaction may be a two-step reaction wherein the polyol and the polyisocyanate are reacted together and thereafter a pendant member is added to the NCO terminated polymer formed.

The isocyanate reactant usefully employed herein may be, for example, methyl isocyanate, ethyl isocyanate, butyl isocyanate, octadecyl isocyanate, methylene diisocyanate, tetramethylene diisocyanate, hexamethylene diisocyanate, 2-methyl-hexamethylene diisocyanate, 3-methyl-hexamethylene diisocyanate, 2,4-dimethyl-hexamethylene diisocyanate, 2,2,4-trimethyl-hexamethylene diisocyanate, 2,4,4-trimethyl-hexamethylene diisocyanate, cyclohexyl isocyanate, phenyl isocyanate, 1-naphthyl isocyanate, methyl cyclohexylene diisocyanate, isophorone diisocyanate, 4,4' methylene bis(cyclohexyl isocyanate), vinyl isocyanate, allyl isocyanate, 9-decenyl isocyanate, phenylene diisocyanate, tolylene diisocyanate, xylylene diisocyanate, methylene bis(phenyl isocyanate), naphthylene diisocyanate, fluorene diisocyanate, toluene sulfonyl isocyanate, and sulfonyl diisocyanate.

The unsaturated monohydroxy reactant usefully employed herein may be, for example, allyl alcohol, trimethylolethane diallyl ether, trimethylolpropane diallyl ether, and pentaerythritol triallyl ether.

The monoamino reactant usefully employed herein may be, for example, allylamine, diallylamine, methyl allyl amine and N-allyl aniline.

In forming the urethane-containing polyenes of the present invention, catalytic amounts of a catalyst may be employed to speed up the reaction. Such catalysts are well known to those in the art and include organometallic compounds such as stannous octoate, stannous oleate, dibutyl tin dilaurate, cobalt acetylacetonate, ferric acetylacetonate, lead naphthenate and dibutyl tin diacetate.

By admixing the polyenes of the present invention with a polythiol containing two or more thiol groups per molecule and thereafter exposing the liquid mixture to free-radical generators, there is provided an essentially odorless solid elastomeric or resinous polymeric product.

Polythiol as used herein refers to simple or complex organic compounds having a multiplicity of pendant or terminally positioned -SH functional groups per average molecule.

On the average the polythiol must contain 2 or more

—SH groups/molecule and have a viscosity range of essentially 0 to 20 million centipoises (cps) at 70°C as measured by a Brookfield Viscometer when in the presence of an inert solvent, aqueous dispersion or plasticizer. Operable polythiols in the instant invention usually have molecular weights in the range about 50 to about 20,000, and preferably from about 100 to about 10,000.

The polythiols operable herein may be exemplified by the general formula $R_3$—$SH_n$ where $n$ is at least 2 and $R_3$ is a polyvalent organic moiety free from reactive carbon-to-carbon unsaturation. Thus, $R_3$ may contain cyclic groupings and hetero atoms such as N, P, or O and primarily contain carbon-carbon, carbon-hydrogen, carbon-oxygen, or silicon-oxygen containing chain linkages free of any reactive carbon-to-carbon unsaturation.

One class of polythiols operable with the present polyenes to obtain essentially odorless polythioether products are esters of thiol-containing acids of the formula HS—$R_4$—COOH where $R_4$ is an organic moiety containing no reactive carbon-to-carbon unsaturation with polyhydroxy compounds of structure $R_5$—$(OH)_n$ where $R_5$ is an organic moiety containing no reactive carbon-to-carbon unsaturation, and n is 2 or greater. These components will react under suitable conditions to give a polythiol having the general structure:

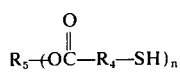

where $R_4$ and $R_5$ are organic moieties containing no reactive carbon-to-carbon unsaturation, and $n$ is 2 or greater.

Polythiols such as the aliphatic monomeric polythiols exemplified by ethane dithiol, hexamethylene dithiol, decamethylene dithiol, tolylene-2,4-dithiol, and the like, and polymeric polythiols such as thiol-terminated ethyl-cyclohexyl dimercaptan polymer, and the like, are operable but may not be widely accepted from a practical commercial point of view because of obnoxious odors. Examples of the polythiol compounds preferred because of relatively low odor level include esters of thioglycolic acid (HS—$CH_2$COOH), α—mercaptopropionic acid (HS—CH(CH$_3$)—COOH), and β-mercaptopropionic acid (HS—$CH_2CH_2$COCH) with polyhydroxy compounds such as glycols, triols, tetraols, pentaols, hexaols, and the like. Specific examples of the preferred polythiols include ethylene glycol bis(thioglycolate), ethylene glycol bis (β-mercaptopropionate), trimethylolpropane tris(thioglycolate), trimethylolpropane tris (β-mercaptopropionate), pentaerythritol tetrakis (thioglycolate), and pentaerythritol tetrakis (β-mercaptopropionate), all of which are commercially available. A specific example of a preferred polymeric polythiol is poly(propylene ether) glycol bis(β-mercaptopropionate) which is prepared from poly(propylene ether) glycol (e.g., Pluracol P-2010, Wyandotte Chemical Corp.) and β-mercaptopropionic acid by esterification.

The preferred polythiol compounds are characterized by a low level of mercaptan-like odor initially, and after reaction give essentially odorless polythioether end products.

To obtain the maximum strength, solvent resistance, creep resistance, heat resistance, and freedom from tackiness, the polyene and polythiol components are formulated in such a manner as to give solid, cross-linked, three-dimensional network polythioether polymer systems on curing. In order to achieve such infinite network formation, the individual polyenes and polythiols must each have an average functionality of at least two and the sum of the functionalities of the polyene and polythiol components must always be greater than four. Blends and mixtures of the polyenes and the polythiols containing such functionalities are also operable herein.

Functionality as used herein refers to the average number of ene or thiol groups per molecule in the polyene or polythiol, respectively. For example, a triene is a polyene with an average of three reactive carbon-to-carbon unsaturated groups per molecule and thus has a functionality of three. A dithiol is a polythiol with an average of two thiol groups per molecule and thus has a functionality of two.

It is to be understood that the functionality of the polyene and the polythiol component is commonly expressed in whole numbers although in practice the actual functionality may be fractional. For example, a polyene component having a nominal functionality of two (from theoretical considerations alone) may in fact have an effective functionality of somewhat less than two.

The polyene/polythiol mole ratio is selected so as to provide a solid, self-supporting, cured product under ambient conditions in the presence of a free radical generator such as actinic light. It is possible to adjust the relative amount of polyenes and polythiols to any values above or below the stoichiometric amount which will lead to insolubilization and which give the desirable properties to the cross-linked polythioether. In general, the mole ratio of ene/thiol groups for preparing the curable composition is from about 0.2/1 to about 5/1, and desirably, about 0.75/1 to about 1.5/1 group ratio.

It is preferred, especially at or near the operable lower limits of functionality in the polyene and polythiol, to use the polythiol and the polyene components in such amounts that there is one thiol group present for each double bond, it being understood that the total functionality of the system must be greater than four, and the functionality of the polythiol and the polyene must each be at least two. For example, if two moles of a triene are used, and a dithiol is used as the curing agent, making the total functionality have a value of five, it is preferable to use three moles of the dithiol. If much less than this amount of the thiol is used, the curing rate will be lower and the product will be weaker because of the reduced cross-link density. If more than the stoichiometric amount of the thiol is used, the rate of cure may be higher, if that is desirable, although excessive amounts can lead to a plasticized cross-linked product which may not have the desired properties.

It must be emphasized that regardless of the ratio of polythiol to polyene, the total functionality of the system must be greater than four or a cross-linked network will not result and the product will be a swellable, chain-extended composition which is unsuitable for the purpose of this invention. Thus in practicing the instant invention, to obtain a solid cross-linked product, it is necessary to use a polyene containing at least two unsaturated carbon-to-carbon bonds per molecule in an amount that the combined functionality of the unsaturated carbon-to-carbon bonds per molecule and the thiol groups per molecule is greater than four.

The curing reaction may be initiated by any free radical mechanism which dissociates or abstracts a hydrogen atom from an SH group, or accomplishes the equivalent thereof. Thus it is possible merely to expose the polyene and polythiol admixture to ambient conditions (oxygen from the air is the initiator) and obtain a cured solid elastomeric or resinous product. Azo compounds or peroxides (with or without amine accelerators) which decompose at ambient conditions are also operable as free radical generating agents capable of curing the components of the instant invention to solid odorless elastomeric or resinous polymer products. Additionally, ultraviolet light with or without curing rate accelerators yield rapid cures.

It is also possible, if desired, to use various forms of high energy irradiation for curing. Peroxides and hydroperoxides, whether or not accelerated, presently used in the curing of unsaturated polyesters are operable as free radical generators to initiate curing. Examples of some operable peroxides and accelerators include but are not limited to, benzoyl peroxide with dimethylaniline as an accelerator, cumene hydroperoxide with cobalt naphthenate as an accelerator and cyclohexanone peroxide with an accelerator. The peroxides and hydroperoxides may also be generated in situ if so desired.

Operable curing means include, but are not limited to oxygen; peroxides, hydroperoxides, peracids; persulfates, azo compounds such as azobis-isovaleronitrile; ultraviolet light (with and without coagent accelerators); high energy radiation such as x-rays, $\beta$-rays, electron beams; gamma radiation, and the like; ozone, oxidizing agents such as $PbO_2$; and cyclohexanone peroxide with dimethyl aniline.

Conventional curing inhibitors or retarders which may be used in order to stabilize either the components or curable composition so as to prevent premature onset of curing may include hydroquinone; p-tert-butyl catechol; 2,6-di-tert-butyl-p-methylphenol; phenothiazine; N-phenyl-2-naphthylamine; inert gas atmospheres such as helium, argon, nitrogen, and carbon dioxide; vacuum; and the like.

A curing rate accelerator may be present as a separate and distinct component of the curable composition. Specifically useful curing rate accelerators include benzophenone, acetophenone, acenaphthenequinone, o-methoxybenzophenone, thioxanthen-9-one, xanthen-9-one, 7H-benz[de]anthracen-7-one, dibenzosuberone, 1-naphthal-dehyde, 4,4'-bis(dimethylamino)benzophenone, fluoren-9-one, 1'-acetonaphthone, 2'-acetonaphthone, anthraquinone, 1-indanone, 2-tert-butylanthraquinone, valerophenone, hexanophenone, 8-phenylbutyrophenone, p-morpholinopropiophenone, 4-morpholinobenzophenone, 4'-morpholinodeoxybenzoin, p-diacetylbenzene, 4-aminobenzophenone, 4'-methoxyacetophenone, benzaldehyde, $\alpha$-tetralone, 9-acetylphenanthrene, 2-acetylphenanthrene, 10-thioxanthenone, 3-acetylphenanthrene, 3-acetylindole, 1,3,5-triacetylbenzene, and the like, including blends thereof.

The curing rate accelerators are usually added in an amount ranging from about 0.0005 to about 50 percent by weight of the curable composition, with a preferred range being from about 0.05 to about 25% by weight. Preferred curing rate accelerators are the aldehyde and ketone carbonyl compounds having at least one aromatic nucleus attached directly to the

group.

The curable composition may, if desired, include additives such as antioxidants, accelerators, dyes, inhibitors, activators, fillers, pigments, antistatic agents, flame-retardant agents, thickeners, thixotropic agents, surface-active agents, viscosity modifiers, extending oils, plasticizers, tackifiers, and the like. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide, and the like. These additives may be present in quantities up to 500 parts or more per 100 parts curable polymer by weight and preferably about 0.0005 to about 300 parts of usable polymer.

By proper choice of type and concentration of curing rate accelerator, the curing period required for conversion of the polyene/polythiol composition may be varied greatly as desired. In combination with suitable accelerators or retarders, the curing period may vary from about a second or less to about 30 minutes or more. In general, short curing periods are achieved in applications where thin films of curable composition are required, whereas the long curing periods are achieved and desired where more massive layers of composition are required.

Actinic light is the most desirable form of free radical generator. Any such source may be used to cure the curable composition. These include carbon arcs, mercury arcs, fluorescent lamps with special ultraviolet light emitting phosphors, xenon arcs, sunlight, tungsten halide lamps, argon glow lamps, photographic flood lamps, and the like. Of these the mercury vapor arcs, particularly the sunlamp type, and the xenon arcs are very useful. The sunlamp mercury vapor arcs are customarily used at a distance of 7 to 10 inches from the curable composition, whereas the xenon arc is placed at a distance of 24 to 40 inches from the curable composition. With a more uniform extended source of low intrinsic brilliance, such as a group of contiguous fluorescent lamps with special phosphors, exposure may be effected within an inch of the lamps.

The present composition is especially useful in preparation of printing plates, although it is recognized that the present polyenes may have numerous other application.

In making printing plates it is essential that the exposure be sufficient to harden the curable composition in the exposed image areas without causing significant curing in the nonimage areas.

A convenient method of preparing printing plates is to place an image-bearing, line or halftone, stencil, or positive or negative transparency parallel to the surface of the cuarble composition which has been cast directly on a support. The image-bearing transparency and the surface of the curable compositon may be in contact or have an air gap therebetween, as desired. The curable layer is exposed through the transparency to a source of actinic light, preferably a point or collimated light source, until the photocurable layer is cured to an insoluble stage in the exposed areas. The thickness of the ultimate relief in such a process may be controlled by varying the thickness of the layer of the curable composition. This may be done, for example, by inserting removable picture-frame type molds of the desired thickness on the support, casting the photocurable composition into the mold and removing any excess with a doctor blade or similar means. The thus prepared plate may then be imaged and developed by removing the non-exposed curable composition.

The following examples will aid in explaining, but should not be deemed as limiting, the instant invention. Unless otherwise noted, all parts and percentages are by weight.

EXAMPLE 1

A round bottom flask is fitted with a stirrer, thermometer, dropping funnel, nitrogen inlet and outlet. The flask can be placed in a heating mantle or immersed in a water bath as required.

Two moles (428 gms.) of trimethylol-propane diallyl ether were mixed with 0.2 cc. of dibutyl tin dilaurate under nitrogen. One mole of tolylene -2,4-diisocyanate was added to the mixture, using the rate of addition and cooling water to keep the temperature under 70°C. The mantle was used to keep the temperature at 70°C. for another hour. Isocyanate analysis showed the reaction to be essentially complete at this time. An antioxidant, 0.6 gms. of 2,6-di-tert-butyl-p-methylphenol was added to prevent vinyl polymerization.

EXAMPLE 2

One mole (602 gms.) of the tetraene prepared by the procedure of Example 1 was mixed with one mole (488 gms.) of pentaerythritol tetrakis-3-mercaptoprionate and 15 gms. of benzophenone. This mixture when layered to 75 mils, cures very rapidly in ultraviolet light to give a hard, strong product. The product was found to have a tensile strength of over 2,000 psi and an ultimate elongation of 50 percent.

EXAMPLE 3

One mole (214 gms.) of trimethylol propane diallyl ether was added to one mole (174 gms.) of tolylene diisocyanate (80% 2,4 isomer, 20% 2,6 isomer) at 70°C. under nitrogen. After 30 minutes at 70°C., 0.2 cc of dibutyl tin dilaurate and 1.1 moles of allyl alcohol (63 gms.) were added. A small amount of the antioxidant of Example 1 was added and the product heated for an hour at 70°C. It was then stripped under vacuum to remove excess allyl alcohol.

EXAMPLE 4

One mole (58 gms.) allyl alcohol was added to one mole of tolylene diisocyanate (174 gms.) and heated at 70°C. for one hour. This resulting product was then added to one mole (98 gms.) of diallyl amine. No additional catalyst was required to complete the reaction.

EXAMPLE 5

One mole of phenyl isocyanate (111 gms.) was added at 70°C. to one mole (256 gms.) of pentaerythritol triallyl ether and 0.15 cc dibutyl tin dilaurate. After reaction, the resulting polyene product was isolated.

EXAMPLE 6

One mole of 4,4'-methylene bis(cyclohexyl isocyanate) (262 gms.) was added to a mixture of one mole of trimethylol propane diallyl ether and one mole of allyl alcohol plus 0.2 cc dibutyl tin dilaurate. After reaction, the resulting polyene product was isolated.

EXAMPLE 7

The isolated products prepared in Examples 3–6 were each combined with pentaerythritol tetramercaptopiopionate and benzophenone by the procedure of Example 2. After exposure to ultra-violet light, corresponding products resulted.

EXAMPLE 8

A curable composition was prepared by the procedure of Example 2 except using the following exposure sequence. A suitable mold for making a printing plate was prepared using a 4-mil thick subbed Mylar film, i.e., subbed poly(ethylene terephthalate) commercially available from Anken Chemical and Film Corp., as a support with a 35-mil thick rubber electric tape stuck thereto about its edges in order to form a frame to contain the liquid curable polymer. The mold was leveled on an adjustable flat table and the curable composition at a temperature of 70°C. was poured into the mold along the edge of the frame and distributed evenly throughout the mold by means of a doctor blade. This technique produces a sufficiently flat surface and plate thickness tolerance of ± 1 mil. An air space of 7 mil thickness between the curable composition and a negative was maintained by means of shims at four corners of the frame. A line negative glued to a photographic grade glass plate with a thin film of the curable composition was placed on the shims with the emulsion side of the negative facing down toward the curable composition. The air space between the top level of the curable composition and the negative was maintained at 7 mils during the exposure.

The curable composition was exposed through the negative to actinic light from a 4,000 watt Ascorlux pulsed xenon arc printing lamp, commercially available from American Speed Light Corp., placed 30 inches above the glass plate. The exposure was for 2 min., 15 sec., during which time the curable composition gelled in the image areas. The nonimage areas remained a liquid of essentially the same viscosity as before exposure.

After exposure the negative was removed and the uncured portion of the curable composition was removed by pouring a small amount of a liquid nonionic surfactant, e.g., Pluronic L-81 commercially available from Wyandotte Chemical Co., on the plate, brushing it with a paint brush and rinsing the liquid away with warm tap water. The curable composition in the image areas was observed to have gelled all the way through to the Mylar film support producing a line image having a thickness of 35 mils. The surface of the nonimage areas of the plate was the Mylar film support. The relief image adhered well to the Mylar film support and was not removed by the rinsing or developing operation. The developed plate was dried and post exposed for 2 min. under the same lamp to harden and detackify the surface.

The thus-formed plate was mounted on a newspaper press using double-face pressure-sensitive tape for adhesion to a printing saddle. Printing was carried out in the same way conventional metal photoengraved plates are employed. The printing results obtained were superior to those with conventional stereotype plate.

The curable compositions are especially useful for producing original, direct-relief printing plates from inexpensive materials with a marked reduction in labor and time requirements over the conventional procedures. The relief images obtained are sharp and show fidelity to the original transparency both in small details and in overall dimensions. In addition, preparation of many types of ruled line plates are possible which could ordinarily be handled only by tedious engraving techniques.

Solid cured polythioether polymer products prepared hereby may have many additional and varied uses, examples of which include but are not limited to adhesives; caulks; sealants; coatings; impregnants for porous substrates; filleting compounds, molded articles and the like.

It is understood that the foregoing detailed description is given merely by way of illustration and that many variations may be made therein without departing from the spirit of this invention.

What is claimed is:

1. A polyene having the formula:

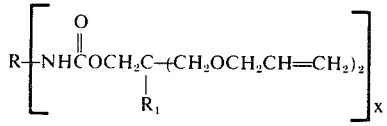

wherein:
R is arylene having 6 to 10 carbon atoms,
$R_1$ is a radical selected from the group consisting of hydrogen and lower alkyl of one to three carbon atoms, and X is 2.

* * * * *